US011752857B2

(12) United States Patent
Nilsson et al.

(10) Patent No.: US 11,752,857 B2
(45) Date of Patent: Sep. 12, 2023

(54) WHEEL-DRIVEN VEHICLE

(71) Applicant: Komatsu Forest AB, Umeå (SE)

(72) Inventors: Erik Nilsson, Obbola (SE); Espen Miland, Hömefors (SE)

(73) Assignee: Komatsu Forest AB, Umeå (SE)

( * ) Notice: Subject to any disclaimer, the term of this patent is extended or adjusted under 35 U.S.C. 154(b) by 326 days.

(21) Appl. No.: 17/287,906

(22) PCT Filed: Oct. 21, 2019

(86) PCT No.: PCT/SE2019/051034
§ 371 (c)(1),
(2) Date: Apr. 22, 2021

(87) PCT Pub. No.: WO2020/085981
PCT Pub. Date: Apr. 30, 2020

(65) Prior Publication Data
US 2021/0354551 A1 Nov. 18, 2021

(30) Foreign Application Priority Data
Oct. 24, 2018 (SE) .................................. 1851314-3

(51) Int. Cl.
*B60K 7/00* (2006.01)
*B60K 17/10* (2006.01)
(Continued)

(52) U.S. Cl.
CPC ............ *B60K 7/0015* (2013.01); *B60K 17/10* (2013.01); *B60K 17/348* (2013.01);
(Continued)

(58) Field of Classification Search
CPC .... B60K 7/0015; B60K 17/10; B60K 17/348; B60K 17/356; B62D 11/04; B62D 55/0655; B60Y 2200/22
See application file for complete search history.

(56) References Cited

U.S. PATENT DOCUMENTS 3,865,208 A * 2/1975 Crawshay .............. B62D 12/00
180/6.62
4,470,475 A 9/1984 Carlson
(Continued)

FOREIGN PATENT DOCUMENTS

| CN | 107310371 A1 | 11/2017 |
| DE | 102005048321 A1 | 4/2007 |
| EP | 2604495 A1 | 6/2013 |

OTHER PUBLICATIONS

International Search Report and Written Opinion for International Application No. PCT/SE2019/051034 dated Jan. 16, 2020, 13 pages.

*Primary Examiner* — Tony H Winner
*Assistant Examiner* — Michael R Stabley
(74) *Attorney, Agent, or Firm* — Morrison & Foerster LLP

(57) ABSTRACT

A wheel-driven vehicle (1), comprising a front vehicle unit (1 A), a rear vehicle unit (1B), a power source (4), a first centre beam (8) and a second centre beam (9), a first driving means (10) and a second driving means (11) provided on each opposite sides of the first centre beam (8), a third driving means (13) and a fourth driving means (14), provided on opposite sides of the second centre beam (9), wherein the respective driving means (10, 11, 13, 14) comprises at least a driving wheel (16), a power-transmitting arrangement for transmission of power from said power source (4) to the driving wheel (16) that is included in each of the driving means (10, 11, 13, 14), wherein the power-transmitting arrangement comprises an engine (19) and a transmitting arrangement (20). The engine (19) is a hydraulic engine, the power-transmitting arrangement comprises separate hydraulic circuits (22, 23, 24, 25) for driving the hydraulic engine (19) of the respective driving means (10, 11, 13, 14), the power-transmitting arrangement comprises one or more pumps (26, 27, 28, 29) driven by the power source (4) for driving the respective hydraulic engine (19) as well as regulating means configured to individually regulate a power output on the respective hydraulic engine (19).

11 Claims, 4 Drawing Sheets

(51) Int. Cl.
  *B60K 17/348* (2006.01)
  *B60K 17/356* (2006.01)
  *B62D 11/04* (2006.01)
  *B62D 55/065* (2006.01)

(52) U.S. Cl.
  CPC ............ *B60K 17/356* (2013.01); *B62D 11/04* (2013.01); *B62D 55/0655* (2013.01); *B60Y 2200/22* (2013.01)

(56) References Cited

U.S. PATENT DOCUMENTS

| | | | | |
|---|---|---|---|---|
| 5,113,958 | A * | 5/1992 | Holden | B62D 11/20 180/9.1 |
| 5,125,467 | A * | 6/1992 | Mancheron | B62D 55/075 180/6.7 |
| 7,757,487 | B2 * | 7/2010 | Smith | F16H 61/4035 60/486 |
| 9,333,997 | B2 * | 5/2016 | Hellholm | B62D 55/0655 |
| 9,403,566 | B2 * | 8/2016 | Jacobsen | B62D 37/04 |
| 9,409,599 | B2 * | 8/2016 | Thorén | B62D 12/00 |
| 9,616,949 | B2 * | 4/2017 | Hellholm | A01G 23/003 |
| 9,630,664 | B2 * | 4/2017 | Hellholm | B62D 7/1509 |
| 9,828,046 | B2 * | 11/2017 | Hellholm | B62D 55/0655 |
| 10,029,748 | B2 * | 7/2018 | Hellholm | B62D 7/026 |
| 2008/0128189 | A1 | 6/2008 | Pruitt et al. | |
| 2008/0141670 | A1 | 6/2008 | Smith | |
| 2010/0307843 | A1 | 12/2010 | Lawson, Jr. | |
| 2012/0221222 | A1 | 8/2012 | Anderson et al. | |
| 2012/0271521 | A1 | 10/2012 | Nordberg | |
| 2016/0046269 | A1 | 2/2016 | Prigent et al. | |
| 2017/0158265 | A1 | 6/2017 | Hellholm et al. | |

* cited by examiner

WHEEL-DRIVEN VEHICLE

CROSS REFERENCE TO RELATED APPLICATIONS

This application is a national stage application under 35 U.S.C. § 371 of International Application No. PCT/SE2019/051034, filed internationally on Oct. 21, 2019, which claims priority to SE 1851314-3, filed Oct. 24, 2018, the disclosures of which are herein incorporated by reference in their entirety.

TECHNICAL FIELD

The present invention relates to a wheel-driven vehicle, comprising a front vehicle unit and a rear vehicle unit, which via a joint arrangement is coupled to the front vehicle unit, a power source, a first centre beam provided on the front vehicle unit and a second centre beam provided on the rear vehicle unit, wherein the first and the second centre beams extend in a longitudinal direction of the vehicle, a first driving means and a second driving means, which are provided on each opposite sides of the first centre beam and accommodated in the first centre beam, a third driving means and a fourth driving means, which are provided on opposite sides of the second centre beam and accommodated in the second centre beam, wherein the respective driving means comprises at least a driving wheel, a power-transmitting arrangement for transmitting power from said power source to the driving wheel that is included in each of the driving means, wherein the power-transmitting arrangement comprises an engine provided in connection with the respective driving wheels and a transmitting arrangement coupled to the engine, which transmitting arrangement is coupled to the driving wheel for driving thereof.

The vehicle can be of the type, in which the driving wheels are arranged to directly engage with the underlying soil, i.e. with a wheel bogie of the type shown and described in our patent application No. 1851090-9 concurrently being processed or of the tracked vehicle type. A tracked vehicle relates to a vehicle that drives on a foundation of one or more continuous tracks, which are provided in so-called track assemblies, in which a driving wheel that belongs to said driving means engages with the track and cause it to move to transfer the vehicle relative to the foundation. According to this definition, a tracked vehicle is also a wheel-driven vehicle.

The vehicle preferably has an active articulation, achieved directly with an active articulation arrangement at the joint arrangement and/or via control of the driving force of the various driving wheels depending on the respective driving wheels' occurring engagement with the foundation. This means that by regulating the speed and thereby the tension force of the individual wheel, which momentarily has a good engagement with the foundation, control operation of the vehicle can be obtained.

PRIOR ART

Traditional hydro-mechanical or mechanical transmissions resolve speed deviations between the front and the rear drive shaft of vehicles with articulation by means of an intermediary differential or so-called guiding duct, wherein, as shown in FIG. 1B, a front shaft L1 (provided on the first vehicle unit) in cornering with the vehicle rotates some percentages % faster than a rear shaft (provided on the second vehicle unit) to compensate for the shaft distance difference between the front shaft and the rear shaft. This is particularly common in 6×6 wheel-driven machines. The speed difference between the inner wheel pair and the outer wheel pair is resolved by means of differential on the front and the rear shafts. All of this is a compromise in order not to generate skidding between the wheels and the soil. As each wheel has different friction, this in practice means that an 8-wheel machine in cornering drives on only 2 of 8 wheels, as a 2-shaft, 8-wheel machine has 4 different movement distances in cornering. To offset this, the intermediary differential is often excluded, so that a front and a rear shaft are always engaged. With this solution, 4 of 8 wheels are in operation, but as L1 and L2 are different, this will be a compromise that results in skidding between the front and the rear shaft. Constant 8-wheel operation requires locking of the front and the rear differential. However, this implies that the inner and the outer wheel pairs constantly skid against the soil in cornering and creates strong forces that will counteract turning of the machine, and in connection with for example forest work, ruptures in the soil layer, which means that considerable soil damage and buoyancy problems arise. Driving with locking of differential of the front and the rear differential also creates major rendering forces that cost energy.

The object of the invention is primarily to present a wheel-driven, preferably articulated, vehicle provided with driving means on a front and a rear vehicle unit, wherein the driving wheels on the front vehicle unit as well as the rear vehicle unit can drive at suitable load outlet on the engine that drives them, so that the driving wheels have the right speed regardless of whether the vehicle is directed to the right or the left or drives straight ahead, and at the same time to be able to extract maximum tension force on all wheels or wheel pairs without the driving wheels or tracks driven by these skid against the foundation on which the vehicle rests.

Another object of the invention is to provide a wheel-driven, articulated vehicle provided with driving means on a front and a rear vehicle unit, which in an efficient manner utilizes the effect from an energy source belonging to the vehicle and distributes it in an efficient and reliable manner to the driving wheels of the vehicle.

SUMMARY

The object of the invention is obtained by the wheel-driven vehicle defined initially in this description and in the preamble of claim 1, characterised in that the engine provided in connection with the respective driving wheels is a hydraulic engine, that the power-transmitting arrangement comprises separate hydraulic circuits for driving the respective driving means' hydraulic engine and that the power-transmitting arrangement comprises one or more of the pumps driven by the power source for driving the respective hydraulic engine as well as regulating means configured to individually regulate a load outlet on the respective hydraulic engine.

According to an exemplary embodiment of the invention, the vehicle comprises a separate pump for each hydraulic circuit, and said regulating means comprises a control unit provided to regulate the power output from the respective pumps individually to the respective hydraulic circuit.

The control unit, as described above and in the following, suitably comprises a processor and a memory and is provided with software adapted to control the operation of various components of the vehicle based on input from various sensors of the vehicle. The processor calculates and controls the pumps and the mutual necessary speed variations of the hydraulic engines depending on the vehicle's steering angle and shaft geometry. The normal propulsion forces of the machine are suitably controlled in the normal way via the respective pump CPU and are primarily driven by the speed request, which typically is a request from a driver, but alternatively could be a computer-generated request if the vehicle is a driverless vehicle.

The control described above implies that the processor regulates the speed of the respective tracks or wheels or wheel pairs by individual regulation of the load outlet of the respective hydraulic engine, and if a track or a wheel would deviate from the theoretically right speed, the control unit is configured to immediately regulate this. In the case of skidding on a track or a wheel, this is regulated by reducing the moment of the relevant driving wheel until the speed is within the right level.

The result of this control is that the vehicle can take out maximum load on the respective driving wheels without locking of the differential or the brakes, which in turn reduces the risk of damaging the underlying soil and breaking the supporting layer of the soil and also makes it possible to drive with all tracks or wheels without skidding.

According to an exemplary embodiment, at least one pump is provided to drive the hydraulic engines of two or more driving means and comprises regulating means, a valve arrangement provided to allow for individual regulation of the power output from the pump to the hydraulic engines belonging to the respective driving means and a control unit to control the valve arrangement and thereby individually regulate a load outlet on the respective hydraulic engines. In this way, solutions that require fewer pumps can be achieved.

According to an exemplary embodiment, the power-transmitting arrangement comprises a first pump provided to drive the hydraulic engines of the first driving means and the fourth driving means via the hydraulic circuits belonging to the first driving means and the fourth driving means and a second pump provided to drive the hydraulic engines of the second driving means and the third driving means via the hydraulic circuits belonging to the second driving means and the third driving means, wherein the first and fourth driving means are provided on opposite sides of a centre line going through the vehicle's first and second centre beams, and the second and the third driving means are also provided on opposite sides of said centre line. A more even power output from each individual pump can thereby be obtained as it often occurs that the driving means that are on the same side of the centre line have larger power output during operation than those on the opposite side. The presented cross coupling therefore evens out the load on the respective pumps.

According to an exemplary embodiment, said regulating means comprises a sensor provided to detect an angle between the first vehicle unit and the second vehicle unit and a control unit provided to individually regulate a load outlet on the respective hydraulic engine based on input from said sensor. The sensor is primarily provided to detect an angle between the front and the rear vehicle unit in a horizontal plane. However, it can also be provided to detect an angle between the front and the rear vehicle unit in a vertical plane. A typical example of a situation where the angle in the vertical plane deviates from zero is when the vehicle drives into a hill, a chine or a dip, whereby the front and the rear centre beams' longitudinal central shafts, which usually are parallel when the vehicle is on a plane foundation, can have an angle deviating from zero relative to each other.

According to an embodiment, said sensor is provided in connection with the joint arrangement.

According to an embodiment, the vehicle comprises at least one power cylinder provided at the joint arrangement and provided to control the angle between the first vehicle unit and the second vehicle unit, and the sensor is provided to detect said angle by detecting a working mode of the power cylinder. This gives a clear indication of the angle, regardless of the power cylinder in the current working situation is active in the actuation or not.

According to an embodiment, said regulating means comprises a respective pump displacement sensor provided to measure the pump displacement for the respective pump, and a control unit provided to regulate the power output from the respective pumps to the respective individual hydraulic circuit based on input from said pump displacement sensor.

According to an embodiment, said regulating means comprises a respective pressure sensor provided to sense the pressure in the respective hydraulic circuit, and a control unit provided to regulate the power output from the respective pumps to the respective individual hydraulic circuit based on input from said pressure sensor.

According to an embodiment, said regulating means comprises a respective pump revolution speed sensor provided to sense the revolution speed of the respective pump, and a control unit provided to regulate the power output from the respective pumps to the respective individual hydraulic circuit based on input from said pump revolution speed sensor.

According to an embodiment, said regulation means comprises a respective hydraulic engine displacement sensor provided to sense displacement of the respective hydraulic engine, and a control unit provided to control the load outlet from the respective hydraulic engine based on input from said hydraulic engine displacement sensor.

According to an exemplary embodiment, said regulation means comprises a respective torque sensor provided to sense a torque of an output shaft from the respective hydraulic engine, and a control unit provided to control the load outlet from the respective hydraulic engine based on input from said torque sensor.

According to an exemplary embodiment, said regulation means comprises a hydraulic engine revolution speed sensor provided to sense the revolution speed of the respective hydraulic engine, and a control unit provided to control the load outlet from the respective hydraulic engine based on input from said hydraulic engine revolution speed sensor.

According to an exemplary embodiment, said regulating means comprises a vehicle position sensor provided to sense the vehicle's global position and motion, and a control unit provided to control the load outlet on the respective hydraulic engine based on input from said vehicle position sensor. The vehicle position sensor can for example be of the GPS sensor type. With such a sensor, it can, among other things, be avoided that all driving wheels skid in such a way that the control unit interprets it to mean that the vehicle is being transferred and therefore does not perform the correct control correction.

According to an embodiment, skidding can be avoided by controlling the moment of the respective wheeled engine by active control of the displacement on each hydrostat engine. If it is sensed that any of the wheels have deviating speed and show a tendency to skidding, whereby said skidding is detected by comparing the other engines' real speed with a predetermined theoretical speed, possibly via GPS sensor globally, the displacement of the current hydrostat engine for the skidding wheel is reduced and at the same time, the driving hydrostat pump's displacement is compensated correspondingly to avoid that a second hydrostat engine and thereby wheels on the same circuit begins to run too fast.

According to an exemplary embodiment, the vehicle is a tracked vehicle, wherein the first driving means comprises a first track assembly, the second driving means comprises a second track assembly, the third driving means comprises a third track assembly, and the fourth driving means comprises a fourth track assembly, wherein the respective track assembly comprises a track-carrying beam, said driving wheel, a plurality of auxiliary wheels and a continuous track that travels upon and around said driving wheel and auxiliary wheels, wherein the hydraulic engine via the transmitting arrangement is coupled to the driving wheel belonging to the track-carrying beam for driving thereof.

According to an embodiment, the power source is a combustion engine, for example an internal combustion engine of the diesel engine type, which suitably is coupled to the pump or the pumps for driving thereof. According to an embodiment, the power source is provided in the first vehicle unit, and the first vehicle unit is a unit provided with an interface and regulation for controlling the vehicle by a driver.

Further characteristics and advantages of the present invention will appear from the following detailed description of exemplary embodiments.

SHORT DESCRIPTION OF DRAWINGS

In the following, an exemplary embodiment of the invention is described with reference to the accompanying drawing, in which:

FIG. 1A is a perspective view of a wheel-driven vehicle of the tracked type according to the invention.

FIG. 1B schematically shows a so-called guiding duct of an articulated vehicle according to FIG. 1A in cornering, wherein a front shaft L1 (provided on a first vehicle unit) must rotate faster than a rear shaft L2 (provided on a second vehicle unit) to compensate for the shaft distance difference between the front shaft and the rear shaft.

FIG. 2 is a schematic circuit diagram of essential components and their functions in a tracked vehicle according to a first exemplary embodiment of the invention, FIG. 3 is a schematic circuit diagram of essential components and their functions in a tracked vehicle according to a second exemplary embodiment of the invention, FIG. 4 is a longitudinal section through a track assembly that is included in a tracked vehicle according to the invention, and which track assembly is viewed along the line IV-IV in FIG. 5.

DETAILED DESCRIPTION

Figure 1A:
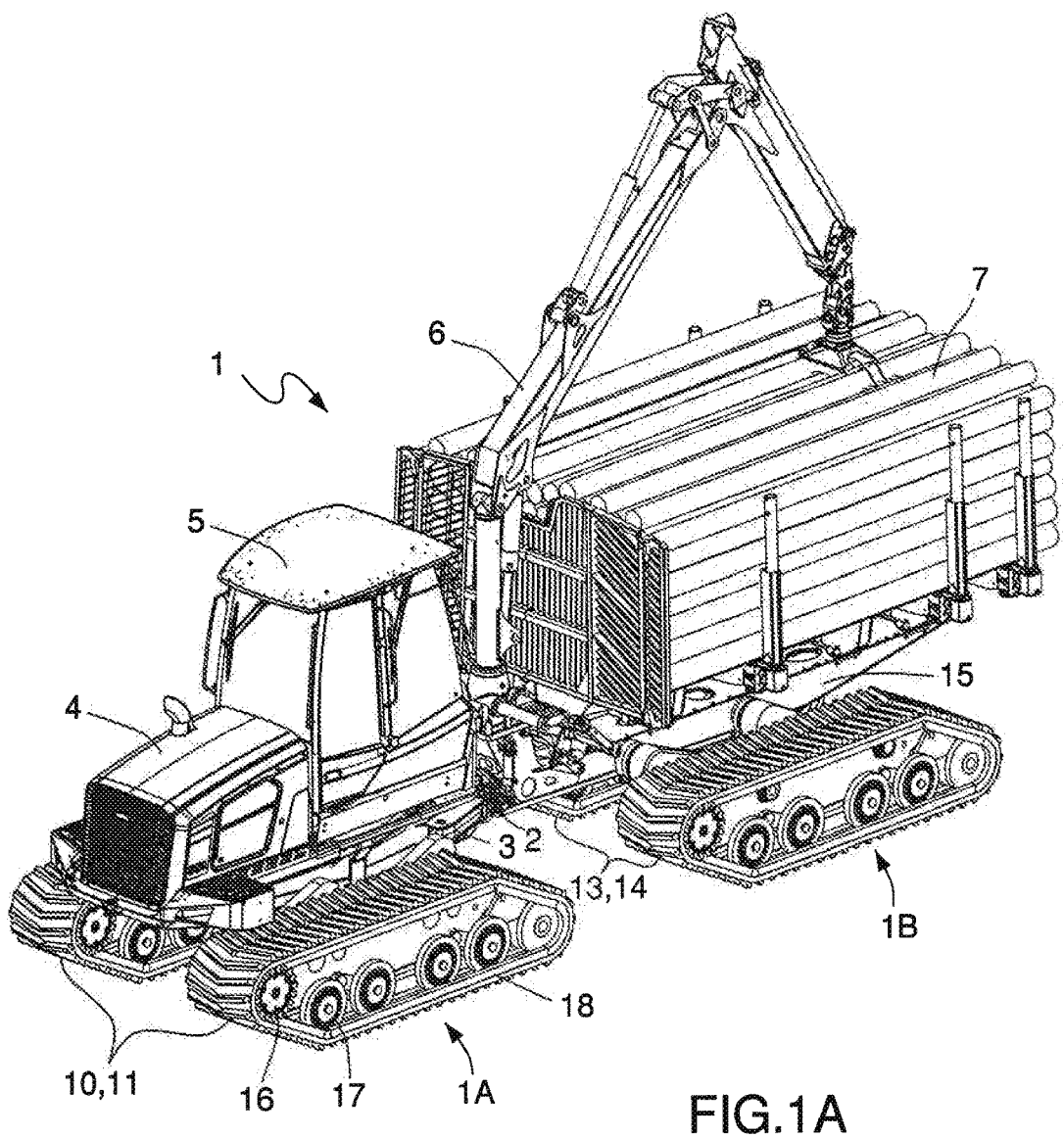

FIG. 1A schematically shows a tracked vehicle 1, which is articulated (jointed) and includes a vehicle combination, comprising a front 1A respectively rear 1B vehicle unit, which are articulately connected with a joint arrangement, hereinafter called control joint 2. The control joint 2 rotates about a vertical rotational axis when the vehicle is on a horizontal plane. In this way, the front vehicle unit 1A and the rear vehicle unit 1B swing laterally relative to each other by means of the power cylinders 3 effective in the control joint 2.

The exemplary tracked vehicle 1 is constituted by a forest machine in the exemplary embodiment described in the following. More specifically by a vehicle combination in the form of a so-called forwarder, the front vehicle unit 1A of which sustains a superstructure, comprising a propulsion engine 4 and a driving cab 5, and whose rear vehicle unit 1B sustains a superstructure comprising a crane 6 and a cargo compartment 7 for timber.

Figure 1B:
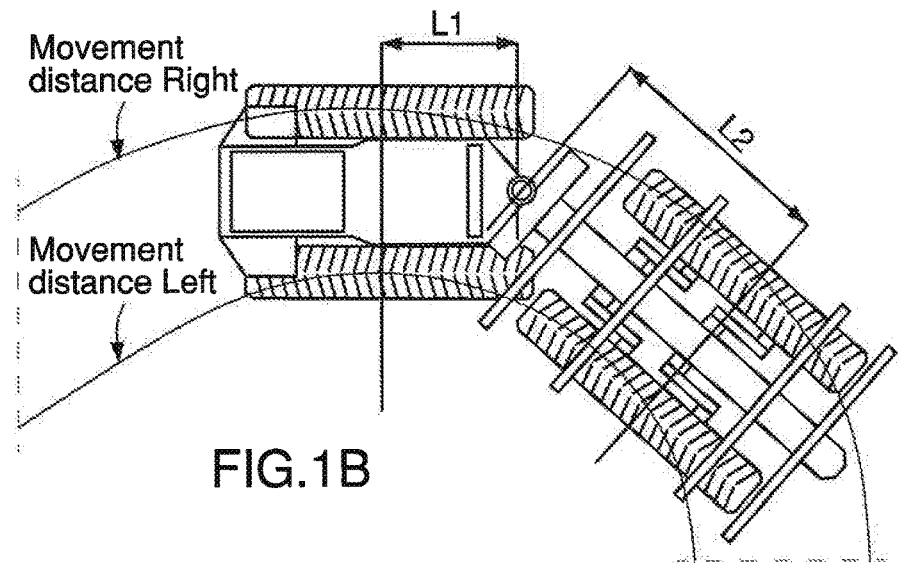

The front 1A and the rear vehicle unit 1B of the vehicle 1 each comprises a centre beam 8, 9. On opposite sides of the centre beam 8 of the front vehicle unit 1A, a first and a second driving means, in this case formed by a first and a second track assembly 10, 11, are arranged and accommodated in the centre beam 8 via carrying arms, one of which has reference numeral 12 in FIG. 1. Correspondingly, on opposite sides of the centre beam 9 of the rear vehicle unit 1B, a third respectively a fourth driving means, here formed by a third respectively a fourth track assembly 13, 14 are arranged and accommodated in the centre beam 9 via carrying arms, which preferably correspond to the carrying arms that are provided in the first vehicle unit 1A and one of which is shown with reference numeral 12.

Figure 4:
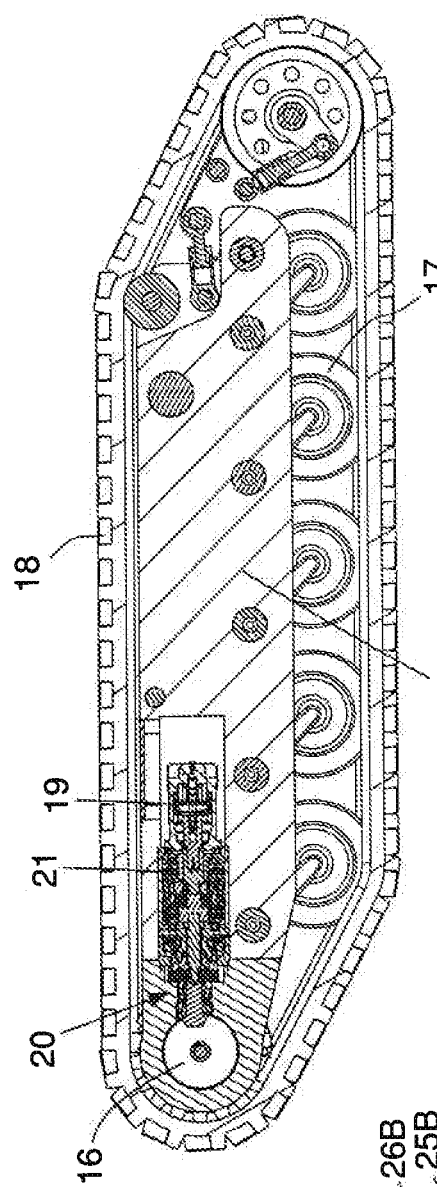
Figure 5:
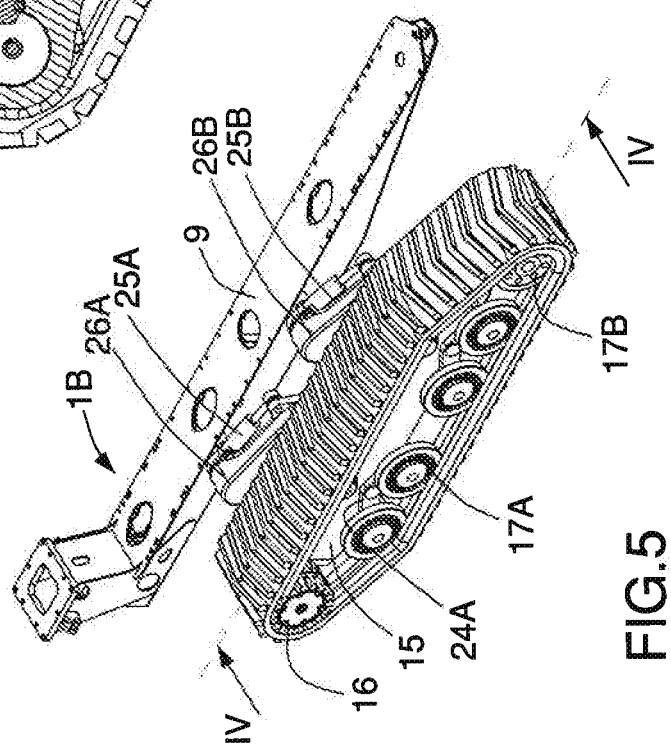
FIG. 5 is a perspective view of a part of the centre beam included in a tracked vehicle according to the invention, which by means of a spring arrangement is pivotably sustained on a track assembly.

In the following, for clarity reasons, only a track assembly 10 is described in detail, but it is to be understood that one or more, preferably all of the other track assemblies 11, 13, 14 of the vehicle 1, have corresponding construction and function as the track assembly described below. In addition to FIG. 1A, a track assembly 10 is also shown in FIGS. 4 and 5. The track assembly 10 comprises a track-carrying beam 15, a front driving wheel 16, a plurality of auxiliary wheels 17 and a continuous track 18, which travels upon and around said front driving wheel 16 and carrying wheel 17A and rear pulley wheel 17B.

The wheeled vehicle's 1 front 1A respectively rear vehicle unit 1B are sustained on said respective track assembly pairs 10, 11; 13, 14. As most clearly appears from FIG. 5, the centre beam 8, 9 is sustained resiliently via a first and second swinging arm device with a type of carrying arm 12, belonging to each track assembly.

In the exemplary embodiment described here, this first swinging arm device comprises a first spring suspension, with which the carrying wheels 17A at each end of the carrying wheel rocker arm 24A are pivotably suspended to the track-carrying beam 20. The second swinging arm device comprises a second spring suspension, comprising a combination of a first spring leg 25A and a first suspension rocker arm 26A as well as a combination of a second suspension leg 25B and a second suspension rocker arm 26B, with which combinations the centre beam 9 of the chassis is spring-supported, sustained on a front respectively rear end of the track-carrying beam 20. This means that the rocker arms are arranged in pairs in such a manner that a centre beam 8, 9 sustained on each track assembly pair 10, 11 respectively 13, 14, can be sprung in both its front as well as its rear portion.

Figure 2:
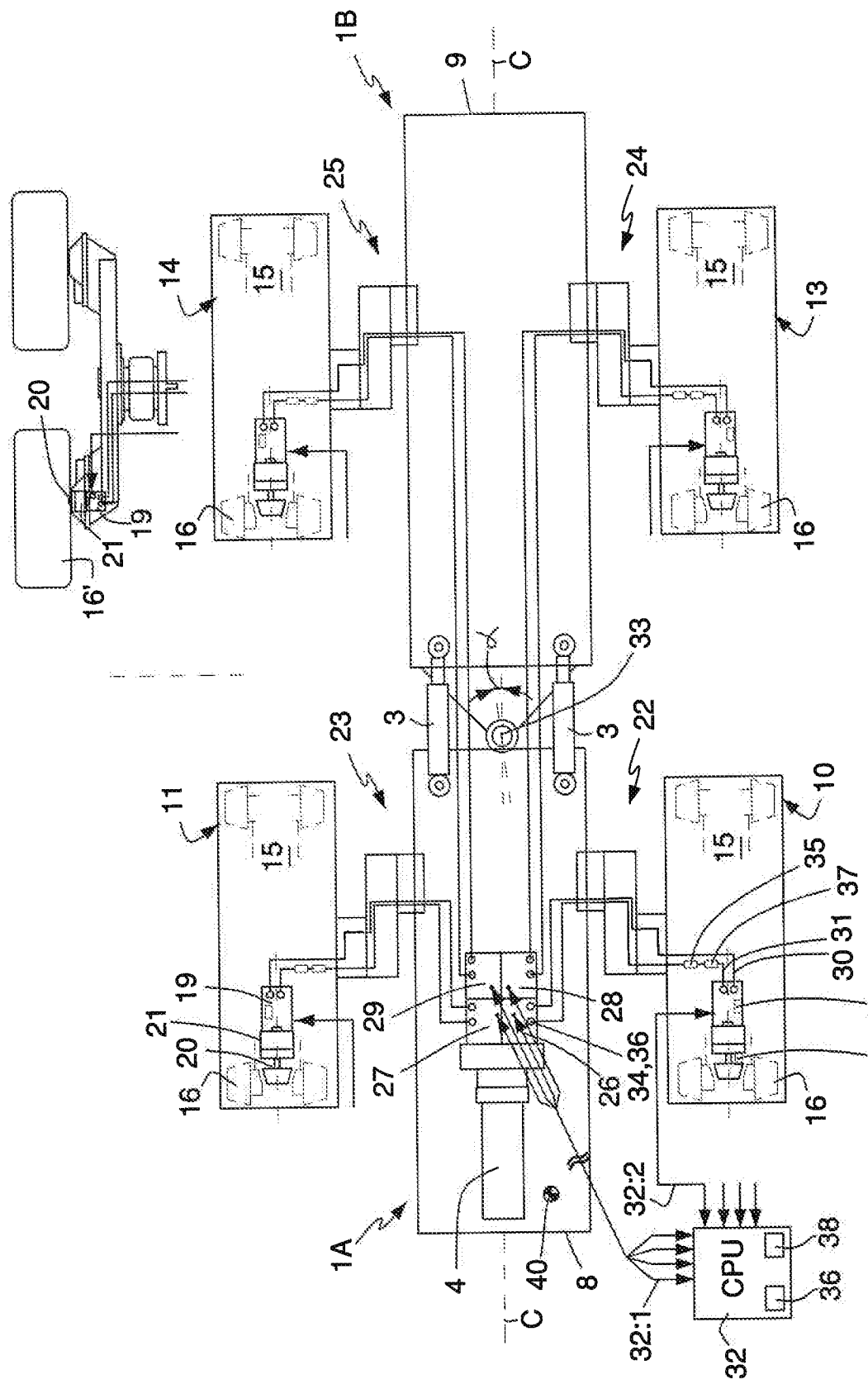

Furthermore, the tracked vehicle 1 comprises a power-transmitting arrangement for transmission of power from a power source, in this case formed by the driving engine 4, of the vehicle 1 to the driving wheel 16 that is comprised in the respective track assembly 10, wherein the power-transmitting arrangement comprises an engine 19 provided in connection with the respective track-carrying beam 15 and a transmitting arrangement 20, which via a bevel gear and possibly reducing steps are coupled to the driving wheel 16 belonging to the track-carrying beam 15 for driving thereof. In connection with the transmitting arrangement 20, a brake device 21 is also provided. The engine 19 is a hydraulic engine. FIG. 2 also shows a wheel frame as an alternative to track operation. It should be understood that a driving means, regardless of whether it includes a continuous track or not, such as in constructions where the driving wheel is in direct contact with the underlying soil, can comprise more than one driving wheel and consequently one or more hydraulic engines.

FIG. 2 is a schematic presentation of essential components for driving the engine 19 of the track assembly 10. The vehicle 1 comprises a power source, which here is an engine device, formed by the propulsion engine 4, which suitably for the case of the forest machine described here is a diesel engine. In this case, the power-transmitting arrangement comprises four, i.e. a first, a second, a third and a fourth separate hydraulic circuit 22-25, one for each driving wheel 16 of the respective track assembly 10, 11, 13, 14. Each hydraulic circuit 22-25 is coupled to a respective hydraulic pump 26-29, which is driven directly by the power source-engine device 4. In other words, the power-transmitting arrangement includes a separate pump 26-29 for each hydraulic circuit 22-25.

The vehicle 1 in FIG. 2 comprises regulating means configured to individually regulate a load outlet on the respective hydraulic engine (19). The regulating means comprise a control unit 32, which in the case of the vehicle shown in FIG. 2 regulates the power output from the respective pumps to the respective hydraulic circuit 22-25 individually. The control unit 32 suitably comprises a processor such as a CPU and a memory and is provided with software adapted to control the pumps 26-29 via communication channels 32:1 respectively 32:2 and the hydraulic engines 19 of the vehicle 1 on the basis of input from various sensors of the vehicle 1, which will be described below.

The control described above implies that the control unit 32 regulates the speed of the respective driving wheel 16 and thereby tracks 18 by individual regulation of the load outlet of the respective hydraulic engine 19, and if a track 18 would deviate from the theoretically right speed, the control unit 32 is configured to immediately regulate this. In the case of skidding on a track 18, this is regulated by reducing the moment of the relevant driving wheel 16 until the speed is within the right level.

In the following, only one of the hydraulic circuits 22-25 are described, but it should be understood that one or more, preferably all of the other hydraulic circuits are arranged in the same manner as the circuit 22 described.

Between the hydraulic pump 26 and the hydraulic engine 19, there is a circuit comprising pipes 30, 31 for inflow respectively outflow of hydraulic fluid to the hydraulic engine 19. The track-carrying beam 15 is pivotably accommodated by the centre beam via said carrying arm 12 and the pipes 30, 31 for transmission of power from the power source to the engine 19 provided in connection with the track-carrying beam extend through the carrying arm 12 and further through the track-carrying beam 15 to the engine 19. The control unit 32 controls the flow through the hydraulic engine 19 and thereby its rotational speed. The control unit 32 is provided to control the respective hydraulic pumps 26-29 individually so as to enable optimum powering of the respective track assembly as regards the prevailing driving conditions for the vehicle.

In addition to the control unit 32, said regulating means comprise an angle sensor 33 provided to detect an angle α between the first vehicle unit 1A and the second vehicle unit 1B, wherein the control unit 32 is provided to individually regulate a load outlet on the respective hydraulic engine 19 based on input from said angle sensor 33. The angle sensor 33 is provided to detect said angle by detecting a working mode of one of the power cylinders 3.

The regulating means further comprise a respective pump displacement sensor 34 provided to measure the pump displacement for the respective pump 26-29, wherein the control unit 32 is provided to regulate the power output from the respective pumps 26-29 to the respective hydraulic circuit 22-25 individually based on input from the pump displacement sensor 34.

The regulating means moreover comprise a respective pressure sensor 35, provided to sense the pressure in the respective hydraulic circuit 22-25, wherein the control unit 32 is provided to regulate the power output from the respective pumps 26-29 to the respective hydraulic circuit 22-25 individually based on input from the pressure sensor 35.

Furthermore, the regulating means comprise a respective pump revolution speed sensor 36, provided to sense the pump revolution speed of the respective pump 26-29, wherein the control unit 32 is provided to regulate the power output from the respective pumps 26-29 to the respective hydraulic circuit 22-25 individually based on input from the pump revolution speed sensor 36.

The regulating means also comprise a respective hydraulic engine displacement sensor 37 provided to sense displacement of the respective hydraulic engine 19, wherein the control unit 32 is provided to control the load outlet from the respective hydraulic engine 19 based on input from the hydraulic engine displacement sensor 37.

Further, the regulation means comprise a respective torque sensor 38 provided to sense a torque of an output shaft from the respective hydraulic engine 19, wherein the control unit 32 is provided to control the load outlet, more specifically the torque, from the respective hydraulic engine 19 based on input from the torque sensor 38.

The regulating means also comprise a respective hydraulic engine revolution speed sensor 39, provided to sense the revolution speed of the respective hydraulic engine 19, wherein the control unit 32 is provided to control the load outlet from the respective hydraulic engine 19 based on input from the hydraulic engine revolution speed sensor 39.

Finally, the regulating means comprise a vehicle position sensor 40, provided to sense the vehicle's global position and motion, wherein the control unit 32 is provided to control the load outlet on the respective hydraulic engine 19 based on input from said vehicle position sensor.

Figure 3:
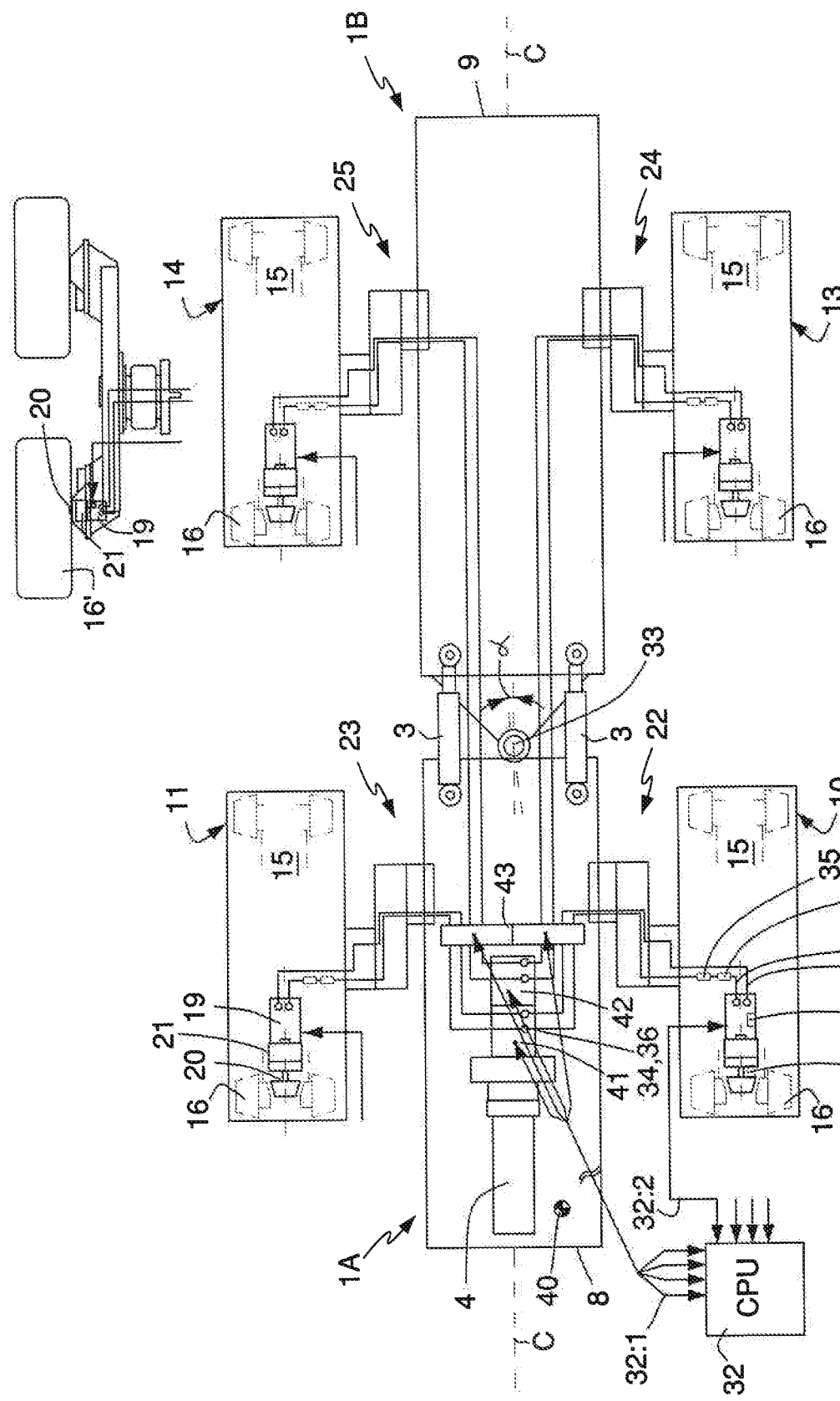

FIG. 3 shows an alternative embodiment of essential components for powering of the hydraulic engines 19 of the track assemblies 10, 11, 13, 14. The embodiment is different from that of FIG. 2 by only having two pumps. In this case, each pump 41, 42 is provided to drive the hydraulic engines 19 of two driving means 10, 11, 13, 14 and comprises regulating means with a valve arrangement 43, provided to allow for individual regulation of the power outlet from the pump to the hydraulic engines 19 belonging to the respective driving means 10, 11, 13, 14, wherein individual moment outlet takes place by means of displacement control of the hydraulic engines 19 (hydrostat engines) of the driving means 10, 11, 13, 14, and at the same time the pump compensates for the varying flow requirement that may occur. The control unit 32 is provided to control the valve arrangement 43 and thereby individually regulate a load outlet on the respective hydraulic engine 19, which is driven by a common pump 41, 42.

In the current case, which is shown in FIG. 3, a first pump 41 is provided to drive the hydraulic engines 19 of the first driving means 10 and the fourth driving means 14 via the first and the fourth hydraulic circuits 22, 25 belonging to the first driving means 10 and the fourth driving means 14, and a second pump 42 is provided to drive the hydraulic engines 19 of the second driving means 11 and the third driving means 13 via the second and third hydraulic circuits 23, 24 belonging to the second driving means 11 and the third driving means 13. The first and the fourth driving means 10, 14 are arranged on opposite sides of a first and a second vehicle 1 centre beam 8, 9 going through the C-C centre line, and the second and third driving means 11, 13 are also arranged on opposite sides of said centre line. In this manner, a relatively more even power output is obtained from the pumps 41, 42 during normal vehicle operation than if the respective pump had been coupled to the driving means of the same side. Otherwise, the exemplary embodiment shown in FIG. 3 essentially corresponds to the exemplary embodiment shown in FIG. 2.

An interesting aspect of the invention deserves mention, namely the possibility of avoiding skidding by controlling the moment of the respective wheel engine by active control of the displacement on each hydrostat engine. In practice, this can take place by the control unit 32, if it is sensed that any of the wheels have deviating speed and show a tendency to skidding, whereby said skidding is detected by comparing the other engines' real speed with a predetermined theoretical speed, possibly via GPS sensor globally, the displacement of the current hydrostat engine for the skidding wheel is reduced and at the same time, the driving hydrostat pump's displacement is compensated correspondingly to avoid that a second hydrostat engine and thereby wheels on the same circuit begin to run too fast.

Figure 6:
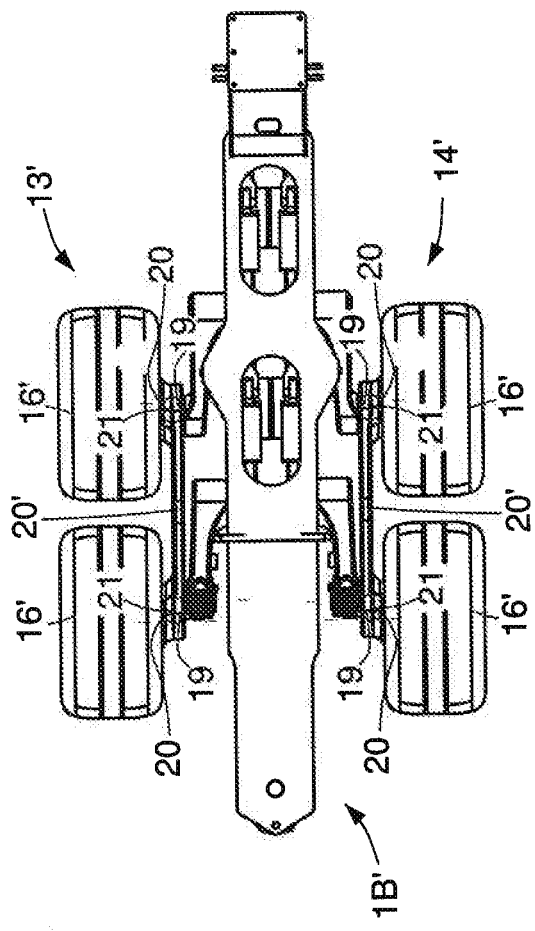
FIG. 6 is a plane view from above of a chassis portion of a wheel-driven vehicle, the wheel suspension of which on opposite sides of the chassis comprises wheels that are mounted in pairs on a bogie element pivotably accommodated and fixed in the chassis.

FIG. 6 shows the present wheel-driven vehicle in an alternative embodiment with a rear 1B chassis portion of a vehicle combination, wherein the wheel suspension 13', 14' on opposite sides of a centre beam 9 or chassis comprises wheels 16', which are mounted in pairs on each side of the chassis in a pivotably accommodated and fixed bogie element 20'. Each wheel 16' is rotatably accommodated in a hub in the bogie element 20'. For each wheel 16', a hydraulic engine 19, which is located on the opposite side of said hub, is arranged in the bogie element. In connection with said hydraulic engine, a brake 21 and a transmitting arrangement 20 are provided. Thus, the vehicle can comprise eight in a hydrostatic path individually drivable wheels 16', which are arranged in pairs in an array after each other on a respective bogie element 20 in a front 1A and a rear 1B vehicle unit.

The wheel-driven vehicle has a first driving means, which comprises a first bogie suspension 10', the second driving means comprises a second bogie suspension 11', the third driving means comprises a third bogie suspension 12', and the fourth driving means comprises a fourth bogie suspension 14', wherein each respective bogie suspension comprises a pair of wheels 16', which are rotatably mounted at each end of a bogie element 20', which is pivotably fixed in a vehicle's centre beam or chassis, a hydraulic engine 19, which, via a transmitting arrangement 20, is coupled to a driving wheel 16' belonging to the bogie element 20' for driving thereof.

The invention claimed is:

1. A wheel-driven vehicle, comprising
a front vehicle unit and a rear vehicle unit, which via a joint arrangement is coupled to the front vehicle unit,
a power source,
a first centre beam provided on the front vehicle unit and a second centre beam provided on the rear vehicle unit, wherein the first and the second centre beams extend in a longitudinal direction of the vehicle,
a first driving means and a second driving means, which are provided each on opposite sides of the first centre beam and accommodated in the first centre beam,
a third driving means and a fourth driving means, which are provided on opposite sides of the second centre beam and accommodated in the second centre beam,
wherein the respective driving means comprise at least one driving wheel,
a power-transmitting arrangement for transmitting power from said power source to the driving wheel that is included in each of the driving means,
wherein the power-transmitting arrangement comprises a hydraulic motor provided in connection with the respective driving wheels and a transmitting arrangement that is coupled to the motor, which transmitting arrangement is coupled to the driving wheel for driving thereof,
wherein
the hydraulic motor provided in connection with the respective driving wheel is a hydrostatic motor,
the power-transmitting arrangement comprises a first, a second, a third, a fourth separate hydraulic circuit for driving of the respective driving means' hydrostatic motor, and
the power-transmitting arrangement comprises one or more pumps driven by the power source for driving the respective hydrostatic motor, and
a regulating means configured to individually regulate a load outlet on the respective hydrostatic motor,
wherein at least one pump is arranged to drive two or more driving means' hydrostatic motor and that said regulating means comprise a valve arrangement provided to allow for individual regulation of the power output from the pump to the hydrostatic motor belonging to the respective driving means,
wherein the regulating means further comprises an angle sensor provided to detect an angle between the first vehicle unit and the second vehicle unit,
a hydrostatic motor displacement sensor provided to sense displacement of the respective hydrostatic motor,
a hydrostatic motor revolution speed sensor provided to sense the revolution speed of the respective hydrostatic motor,
a vehicle position sensor provided to sense the vehicle's global position and motion, and a control unit provided to control the valve arrangement and thereby individually regulate a load outlet on the respective hydrostatic motor, wherein the control unit is provided to individually regulate the load outlet on the respective hydrostatic motor based on input from said angle sensor, hydrostatic motor revolution speed sensor and said vehicle position sensor.

2. The wheel-driven vehicle according to claim 1, wherein the power-transmitting arrangement comprises a separate pump for each first, second, third, fourth hydraulic circuit, and said regulating means comprise a control unit provided to regulate the power output from the respective pumps to the respective hydraulic circuit individually.

3. The wheel-driven vehicle according to claim 1, wherein the power-transmitting arrangement comprises a first pump provided to drive the hydrostatic motors of the first driving means and the fourth driving means via the first and fourth hydraulic circuits, respectively, belonging to the first driving means and the fourth driving means, respectively, and a second pump provided to drive the hydrostatic motor of the second driving means and the third driving means via the second and third hydraulic circuits, respectively, belonging to the second driving means and the third driving means, respectively, and wherein the first and fourth driving means are provided on opposite sides of a centre line going through the vehicle's first and second centre beams, and wherein the second and third driving means are also provided on opposite sides of said centre line.

4. The wheel-driven vehicle according to claim 3, consisting of a tracked vehicle, wherein the first driving means comprises a first track assembly, the second driving means comprises a second track assembly, the third driving means comprises a third track assembly and the fourth driving means comprises a fourth track assembly,
wherein the respective track assembly comprises a track-carrying beam, said driving wheel, a pulley wheel, a plurality of carrying wheels and a continuous track that travels upon and around said driving wheel and auxiliary wheels,
wherein the hydrostatic motor via the transmitting arrangement is coupled to the driving wheel belonging to the track-carrying beam for driving thereof.

5. The wheel-driven vehicle according to claim 3, consisting of a wheeled vehicle, wherein the first driving means comprises a first bogie suspension, the second driving means comprises a second bogie suspension, the third driving means comprises a third bogie suspension, and the fourth driving means comprises a fourth bogie suspension, wherein each respective bogie suspension comprises a pair of wheels, which are rotatably mounted at each end of a bogie element, which is pivotably fixed in a vehicle's centre beam or chassis, a hydrostatic motor, which via a transmitting arrangement is coupled to a driving wheel belonging to the bogie element for driving thereof.

6. The wheel-driven vehicle according to claim 1, wherein said angle sensor is provided in connection with the joint arrangement.

7. The wheel-driven vehicle according to claim 1, comprising at least one power cylinder provided at the joint arrangement and provided to control the angle between the first vehicle unit and the second vehicle unit, and the angle sensor is provided to detect said angle by detecting a working mode of the power cylinder.

8. The wheel-driven vehicle according to claim 1, wherein the regulating means comprises a respective pump displacement sensor provided to measure the pump displacement for the respective pump, and a control unit is provided to regulate the power output from the respective pumps to the respective hydraulic circuit individually based on input from said pump displacement sensor.

9. The wheel-driven vehicle according to claim 1, wherein the regulating means comprises a respective pressure sensor provided to sense the pressure in the respective hydraulic circuit, and a control unit provided to regulate the power output from the respective pumps to the respective hydraulic circuit individually based on input from said pressure sensor.

10. The wheel-driven vehicle according to claim 1, wherein the regulating means comprises a respective pump revolution speed sensor provided to sense the revolution speed of the respective pump, and a control unit provided to regulate the power output from the respective pumps to the respective hydraulic circuit individually based on input from said pump revolution speed sensor.

11. The wheel-driven vehicle according to claim 1, wherein the regulation means comprises a respective torque sensor provided to sense a torque of an output shaft from the respective hydrostatic motor, and a control unit provided to control the load outlet from the respective hydrostatic motor based on input from said torque sensor.

* * * * *